United States Patent

Van Leeuwen et al.

[11] Patent Number: 5,667,177
[45] Date of Patent: Sep. 16, 1997

[54] SPRING SNAP CLIP

[75] Inventors: Martin Van Leeuwen, Tilburg; Henk A.W.M. Schraven, Goirle, both of Netherlands

[73] Assignee: Erico International Corporation, Solon, Ohio

[21] Appl. No.: 423,530

[22] Filed: Apr. 17, 1995

[30] Foreign Application Priority Data

Apr. 18, 1994 [NL] Netherlands ............... 9407678

[51] Int. Cl.⁶ .................................................. F16L 3/08
[52] U.S. Cl. ................................. 248/74.2; 248/73
[58] Field of Search .................... 248/74.2, 62, 63, 248/64, 71, 73

[56] References Cited

U.S. PATENT DOCUMENTS

| 3,077,018 | 2/1963 | Cochran | 248/73 |
| 4,548,376 | 10/1985 | DeGore | 248/205.4 |

FOREIGN PATENT DOCUMENTS

| 86736 | 2/1966 | France . |
| 742453 | 12/1955 | United Kingdom . |
| 833125 | 4/1960 | United Kingdom . |

OTHER PUBLICATIONS

Caddy Fasteners, "#449 Snap Clamp For BX", 1989, p. 23, Erico Products Inc.

Erico®, SC Clip, p. 53.

Primary Examiner—Robert W. Gibson, Jr.
Attorney, Agent, or Firm—Renner, Otto, Boisselle, Sklar

[57] ABSTRACT

A snap spring clip supports conduit, cables, and the like from a structure and has a C-shape body with one end of the body cooperating with the other end to form a restricted opening into which such conduit, cables and the like may be snapped. The one end of the body may be formed with a reversely flared lip while the other end is folded back on itself to form a U-shape clasp, the outer leg of the clasp being in the form of a more narrow finger extending generally parallel and adjacent the inner leg. The finger is somewhat longer than the inner leg and extends midway between barbs struck from each edge of the inner leg. The U-shape clasp is formed with a flattened bulb fold providing sufficient area to push the clip to a locking position with the finger extending through a hole. Once in the hole, because of the configuration of the fold, and the relative size of the hole and finger width, the clip is locked in place.

10 Claims, 1 Drawing Sheet

SPRING SNAP CLIP

This invention relates generally as indicated to a spring snap clip for supporting conduit, cables or the like from small holes in structures, walls, or even other clips.

BACKGROUND OF THE INVENTION

Spring snap clips have been widely used to support conduit or cabling, for example. Such spring metal clips may include a C-shape body portion into which a conduit, cabling or the like is snapped or simply supported. Such clips are designed to snap on relatively thick linear edges of structures such as flanges of beams or purlins and include a relatively wide U-shape portion at one end of the C body. Both legs of the U-shape portion include struck barbs to bite into the structure. The clips usually have to be inserted on the edge by a hammer to ensure that the clip is properly seated. Such clips are not suitable for small holes, and particularly such holes in thin gauge metal sheet.

Accordingly, it would be desirable to have a clip which could readily be inserted in small holes in structures, walls, or even in holes in other clips, for example. It would also be desirable to have such a clip that is locked in the hole and won't turn out when the conduit or cable is mounted, or when subjected to unusual forces.

SUMMARY OF THE INVENTION

A snap spring clip to support conduit, cables, and the like from a structure has a C-shape body with one end of the body cooperating with the other end to form a restricted opening into which such conduit or cables may be snapped. The one end may be formed with a reversely flared lip while the other end is folded back on itself to form a U-shape clasp. The inner leg of the clasp is the same width as the body while the outer leg of the clasp is in the form of a more narrow finger extending generally parallel and adjacent the inner leg. The finger is somewhat longer than the inner leg and extends midway between barbs struck from each edge of the inner leg. The U-shape clasp is formed with a flattened bulb fold providing sufficient area to push the clip to a locking position with the finger extending through a hole.

The transition to the more narrow finger is near the center of the bulb fold and two shoulders are provided on each side of the finger adapted to abut the structure on opposite sides of the hole. When inserted, the barbs are symmetrically positioned on each side of the finger and symmetrically offset from the center of the hole. The C-shape body of the clip is generally circular except that the U-shape clasp at the other end of the body extends as a chord of the circle giving the clip the general appearance in an edge profile of a latin G. The flattened bulb fold of the clasp cooperates with the reversely flared lip to enable the item supported readily to be snapped into the interior of the body. The clip is designed for holes having a diameter of about 7 mm. The thickness of the wall in which the hole is formed may be from about 0.50 to about 2.0 mm. The finger has a width of approximately 6 mm which is slightly less than the diameter of the hole but which limits movement of the clip once inserted. The configuration of the fold in combination with the relative dimensions of the hole and finger effectively locks the finger in the hole.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENTS

Figure 1:
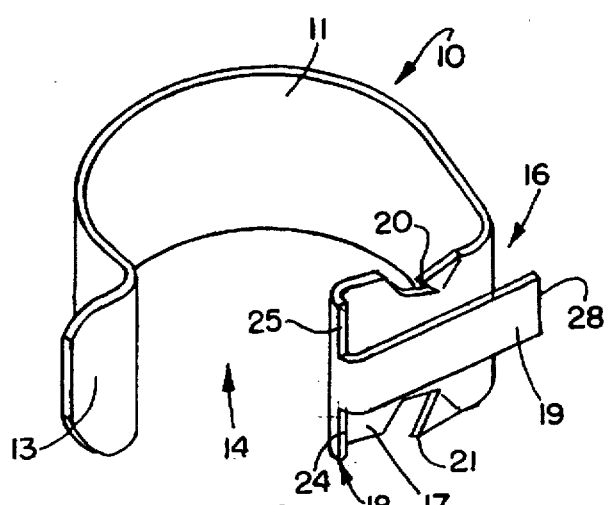
FIG. 1 is a perspective view of a clip in accordance with the present invention.

Referring initially to FIG. 1, there is shown at 10 a small hole snap clip in accordance with the present invention. The clip comprises a C-shape body 11 of uniform width. One end of the body terminates in a reversely flared lip 13 which forms one edge of opening 14. The other edge of the opening is formed by U-shape clasp 16. The U-shape clasp includes a inner leg 17 which is a continuation of the C-shape body, a bulb type somewhat enlarged flattened fold 18, and a projecting more narrow finger 19 which forms the outer leg of the U. The inner leg 17 is provided on its edge with two pointed struck barbs seen at 20 and 21 which are directed toward the outer leg or finger 19. As illustrated the fold has a somewhat flattened top 22 with relatively short radii on either side.

The transition between the inner leg and the outer leg occurs at the approximate center of the bight portion of the U-shape clasp and such transition forms shoulders 24 and 25 on opposite sides of the finger at the fold.

Figure 2:
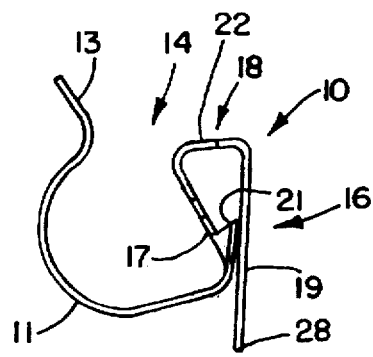
FIG. 2 is an edge view of the clip.
Figures 3, 5:
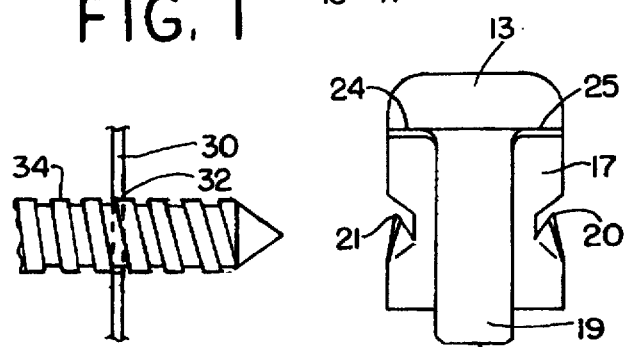
FIG. 3 is an elevation of the clip showing the finger.
FIG. 5–7 are schematic illustrations showing the formation of the hole and insertion of the flip.

It is noted that the U-shape clasp 16 forming one edge of the opening 14 extends generally as a chord of the circle of the body so that the clip configuration is generally in the form of a latin letter G. The more narrow finger 19 extends slightly beyond the C-shape body as indicated by the tip 28. The finger also extends adjacent the inner leg and midway between the two edge barbs 20 and 21. This relationship is shown more clearly in FIGS. 2 and 3.

In FIGS. 4, 5, 6 and 7, there is illustrated the wall 30 of a structure to which the clip is to be attached. A relatively small hole 32 is formed in the wall such as by the drill 34 seen in FIG. 5. As an example, the diameter of the hole may be on the order of 7 mm while the thickness of the wall may be on the order of from about 0.5 mm to about 2 mm, while the finger is about 6 mm wide.

Figure 6:
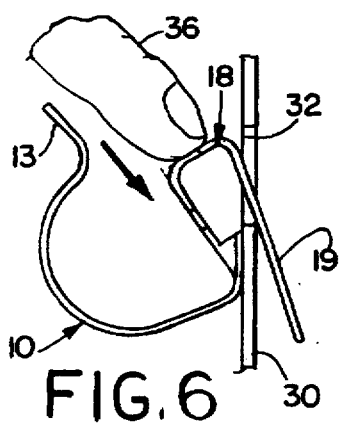

After the hole is formed the projecting finger 19 is inserted in the hole and the clip is simply pushed down or radially of the hole by the installer's finger indicated at 36 pushing on the substantial area of the top of the bulb fold of the U-shape clasp. The finger 19 springs away from the inner leg as seen in FIG. 6 and as the clip is pushed radially of the hole the barbs 20 and 21 engage and bite into the side of the wall as illustrated at 38 in FIG. 7. When the clip is properly seated, the shoulders 24 and 25 may abut the wall on opposite sides of the hole as seen in FIG. 4, and the finger 19 is substantially parallel to and against the back of the wall.

Figure 4:
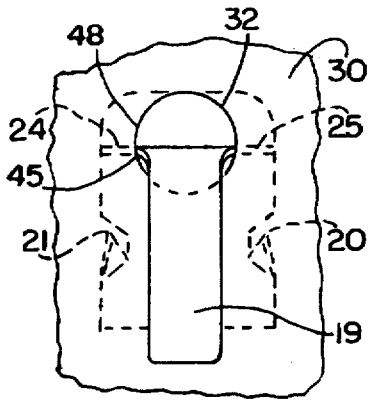
FIG. 4 is a view similar to FIG. 4 showing the finger inserted through a hole but taken from behind the hole.

Also as seen in FIG. 4, the barb points 20 and 21 are symmetrically spaced from the center of the hole and also symmetrically spaced from the finger 19. The installer, in addition to using a finger, may use the tip of a tool such as a screw driver to assist in inserting the clip in the hole and seating the clip on the wall.

Figure 7:
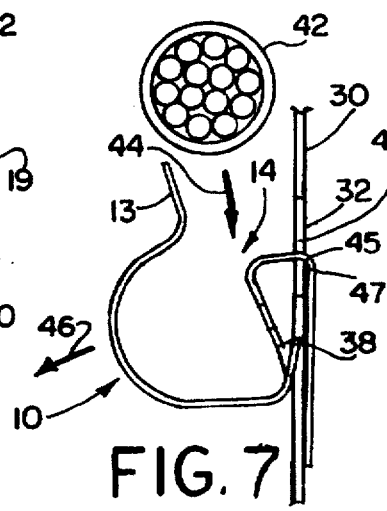

As seen in FIG. 7, after the clip is in place the cable, conduit, or the like shown at 42 may be snapped through the opening 14 in the direction of the arrow 44. The configuration of the fold and the reverse or flared lip 13 assists in such snap insertion.

As illustrated in FIG. 6, when inserted the finger 19 is forced open and in FIG. 7 the finger has relaxed somewhat and the clip can be pushed radially until the edges of the finger contact the edges of the hole. These contact points are shown at 45 in FIGS. 4 and 7. If a force on the clip in the direction of the arrow 46 seen in FIG. 7 tries intentionally to pull the clip out, the clip will hinge at the barb engagement 38. However, the upper end of the inside of the finger 49 is almost at the contact points 45. Thus the force to open the finger is almost infinite.

Even if the clip is moved to its most unfavorable position (upwardly in FIG. 7, which movement the barbs resist), the finger will quickly engage the hole edge at approximately the point 48. The point 48 is symmetrical with the opposite point 45 on a horizontal diameter of the hole. Accordingly, the movement arm from 48 to 45 less the thickness of the clip, acting to open the finger from the force in the direction of the arrow 46 is still too small. This distance is of course limited by the relative dimension of the hole diameter and the width of the finger. Any force which would pull the clip out would destroy the clip and perhaps the wall too. Such force is well beyond normal use. The only way the clip can be removed is to reach behind the wall and pry the finger away from the wall.

Although the clip is shown inserted in round holes, it will be appreciated that other shape holes may receive the finger 19 such as rectangular slots. Round or rectangular holes are frequently employed in construction clips to hang various items or to join the clip with some other clip or other type fastener. Also, it should be appreciated that the wall to which the clip is affixed need not necessarily be vertical.

Figure 8:
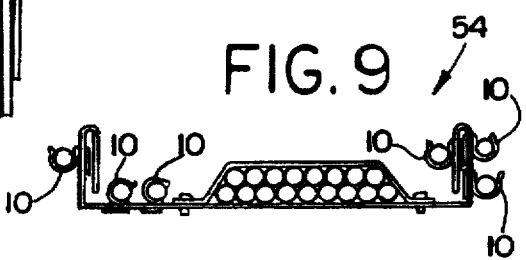
FIG. 8 is a schematic illustration showing the clip applied to trapezium decking or wall cladding.

In FIG. 8, there are illustrated four clips in accordance with the present invention supporting conduit or cabling 50 and 51 from the bottom of trapezium decking 52. The conduit or cabling 50 is supported from a sloping wall while the conduit or cabling 51 is supported from a horizontal wall.

Figure 9:
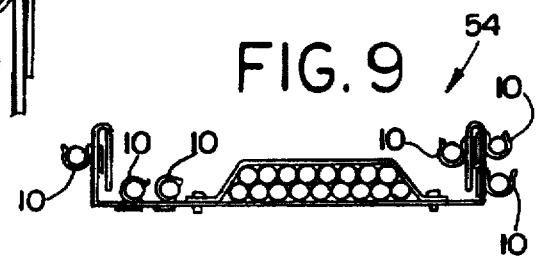
FIG. 9 is a schematic illustration showing the clip applied to various parts of a pre-perforated cable tray.

Another application is the perforated cable tray seen at 54 in FIG. 9. As seen in FIG. 9, the clips can be mounted on an outside vertical wall, a horizontal wall, or an inside vertical wall. The clips may vary in size to accommodate different diameter conduit or cabling.

It can now be seen that there is provided a clip which can readily be inserted in small holes in relatively thin gauge structures or walls, or even holes in other clips. The clip can be inserted without being struck by a hammer.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

What is claimed is:

1. A small hole snap spring clip comprising a C-shape body forming an opening into which wiring, conduit, or cabling may be inserted and supported, one end of the body forming one edge of the opening, the other end of the body forming the other edge of the opening and said other end being folded to form a U-shape clasp with an interior leg and an exterior leg, the interior leg being the same width as the body while the exterior leg is more narrow than the interior leg and forms a finger, struck barbs on the edges of the interior leg struck toward the exterior leg and straddling the narrower exterior finger, whereby the finger may readily be inserted through a small hole in a structure wall to mount the clip thereon and to support such wiring, conduit or cabling therefrom, with the barbs biting into the structure offset from the hole, said U-shape other end including a flattened bulb fold whereby sufficient surface area is provided on top of the fold to install the clip without hammering, a transition between the interior leg and the more narrow finger near the center of the bulb fold, the more narrow finger extending generally parallel to and midway between the edges of the interior leg and thus the barbs, the transition to the more narrow finger forming shoulders on each side of the finger.

2. A snap clip as set forth in claim 1 wherein the barbs on the interior leg are symmetrically spaced from the finger and the hole when the clip in inserted.

3. A snap clip as set forth in claim 2 wherein said finger is substantially longer than the interior leg of said clasp.

4. A snap clip as set forth in claim 1 wherein said one end of said body has a reversely flared lip extending away from the opening.

5. A snap clip as set forth in claim 4 wherein said U-shape other end restricts the opening of the C-shape body in cooperation with the reversely flared lip.

6. A snap clip as set forth in claim 1 wherein said C-shape body is generally circular except for the opening and except that said clasp extends as a partial chord of the circle of the body so that said clip appears in edge profile generally as a latin G.

7. A snap clip as set forth in claim 1 including in combination the structure wall with the small hole therein, said finger being inserted through said hole and said clasp pushed radially of the hole, with said barbs being symmetrically offset from the center of the hole.

8. A snap clip as set forth in claim 7 wherein said hole is on the order of 7 mm in diameter, said finger having a width only somewhat less than said diameter.

9. A snap clip as set forth in claim 7 wherein said finger lies substantially flush against the back of said wall when the clip is inserted.

10. A snap clip as set forth in claim 7 wherein the ratio of a diameter of said hole and a width of said finger is about 7 to 6.

* * * * *